(12) United States Patent
Lo et al.

(10) Patent No.: US 12,744,886 B2
(45) Date of Patent: Sep. 22, 2026

(54) METHOD AND APPARATUS FOR REGRESSION-BASED AFFINE MERGE MODE MOTION VECTOR DERIVATION IN VIDEO CODING SYSTEMS

(71) Applicant: MEDIATEK INC., Hsinchu City (TW)

(72) Inventors: Chih-Hsuan Lo, Hsinchu City (TW); Tzu-Der Chuang, Hsinchu City (TW); Ching-Yeh Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 7 days.

(21) Appl. No.: 18/857,950

(22) PCT Filed: Apr. 21, 2023

(86) PCT No.: PCT/CN2023/089884
§ 371 (c)(1),
(2) Date: Oct. 18, 2024

(87) PCT Pub. No.: WO2023/202713
PCT Pub. Date: Oct. 26, 2023

(65) Prior Publication Data

US 2025/0280106 A1 Sep. 4, 2025

Related U.S. Application Data

(60) Provisional application No. 63/333,592, filed on Apr. 22, 2022.

(51) Int. Cl.
*H04N 19/513* (2014.01)
*H04N 19/105* (2014.01)
(Continued)

(52) U.S. Cl.
CPC ......... *H04N 19/105* (2014.11); *H04N 19/137* (2014.11); *H04N 19/176* (2014.11); *H04N 19/182* (2014.11)

(58) Field of Classification Search
None
See application file for complete search history.

(56) References Cited

U.S. PATENT DOCUMENTS 10,834,417 B2 11/2020 Xu
2020/0007889 A1 1/2020 Chao
(Continued)

FOREIGN PATENT DOCUMENTS

CN 110944185 A 3/2020

OTHER PUBLICATIONS

International Search Report and Written Opinion dated Jun. 15, 2023, issued in application No. PCT/CN2023/089884.
(Continued)

*Primary Examiner* — Christopher G Findley
(74) *Attorney, Agent, or Firm* — McClure, Qualey & Rodack, LLP

(57) ABSTRACT

A method and apparatus for video coding using regression MV derivation. According to the method, CPMVs for the current block, affine parameter sets or regression models are derived based on a non-adjacent affine-coded block. The CPMVs, affine parameter sets or regression models are blended with neighbouring MVs of subblocks within a neighbouring region associated with at least one of the CPMVs, affine parameter sets or regression models to generate at least one blended MV. A CPMV set comprising the blended MV is inserted into a merge candidate list. According to another method, a subset of subblocks of a non-adjacent affine-coded block is determined. A set of CPMVs or SBMVs are derived based on the subset of subblocks of the non-adjacent affine-coded block. The derived MVs are derived for the current block based on a regression process with input MVs including the set of CPMVs or SBMVs associated with the subset.

14 Claims, 8 Drawing Sheets

(51) Int. Cl.
*H04N 19/137* (2014.01)
*H04N 19/176* (2014.01)
*H04N 19/182* (2014.01)

(56) References Cited

U.S. PATENT DOCUMENTS

| | | | | |
|---|---|---|---|---|
| 2021/0203943 | A1 | 7/2021 | Lin | |
| 2021/0385483 | A1 | 12/2021 | Liu | |
| 2023/0328276 | A1* | 10/2023 | Zhang | H04N 19/573 |

OTHER PUBLICATIONS

Ghaznavi-Youvalari, R., et al.; "CE2: Merge Mode with Regression-based Motion Vector Field (Test 2.3.3) (JVET-M0302);" Joint Video Experts Team (JVET) of ITU-T SG 16 WP 3 and ISO/IEC JTC 1/SC 29/WG 11; Jan. 2019; pp. 1-6.

* cited by examiner

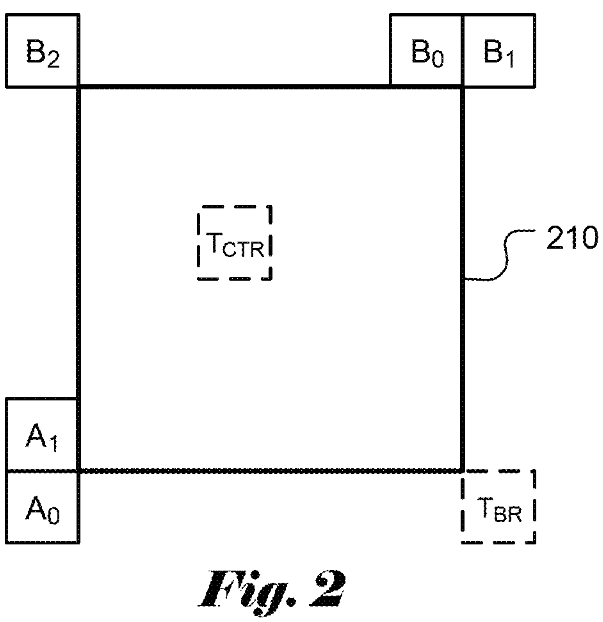
Fig. 2
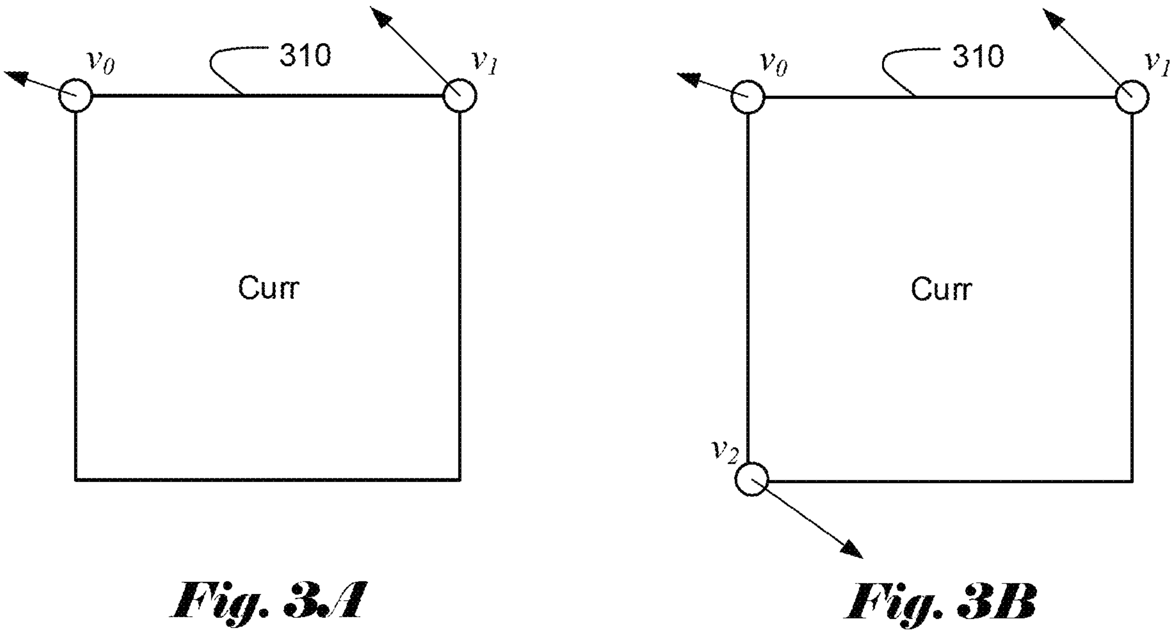
Fig. 3A
Fig. 3B

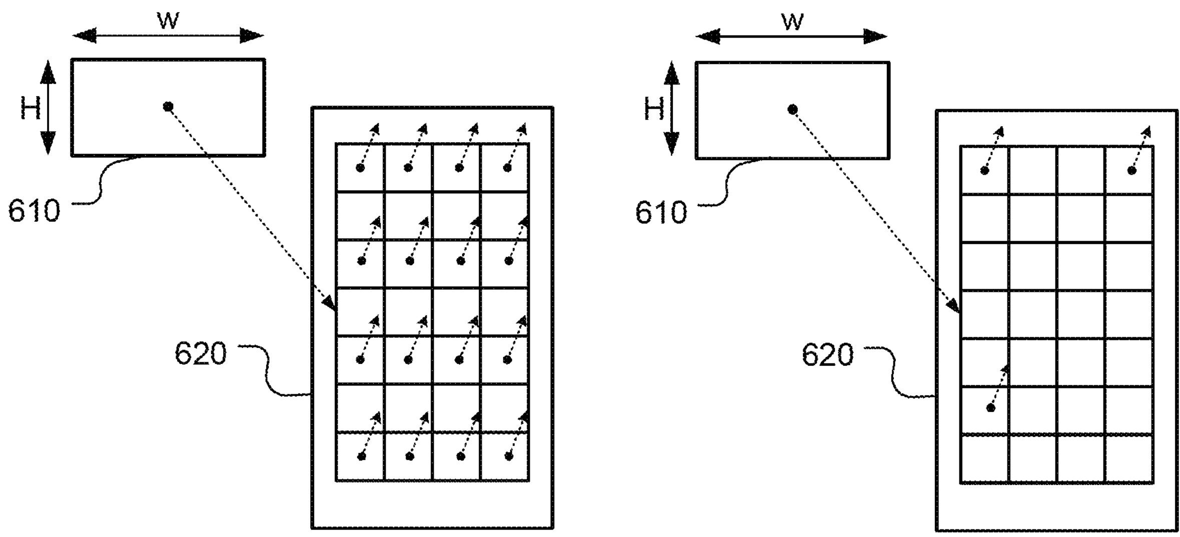
Fig. 6A
Fig. 6B
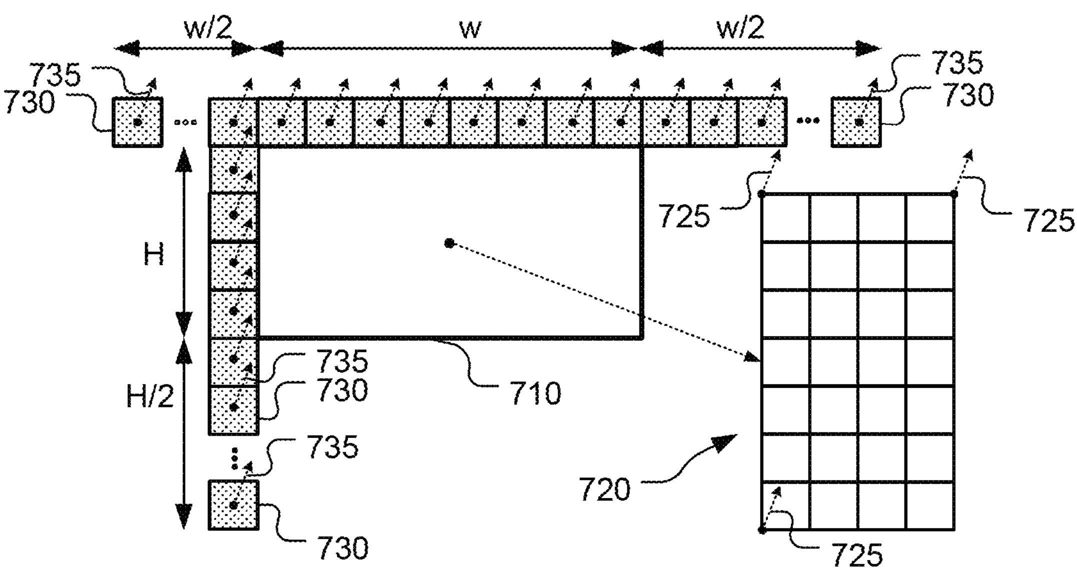
Fig. 7

METHOD AND APPARATUS FOR REGRESSION-BASED AFFINE MERGE MODE MOTION VECTOR DERIVATION IN VIDEO CODING SYSTEMS

CROSS REFERENCE TO RELATED APPLICATIONS

The present invention is a non-Provisional Applications of and claims priority to U.S. Provisional Patent Application No. 63/333,592 filed on Apr. 22, 2022. The U.S. Provisional Patent Application is hereby incorporated by reference in its entirety.

FIELD OF THE INVENTION

The present invention relates to video coding system using regression model coding tool to generate derived motion vector(s). In particular, the present invention relates to methods to reduce computational complexity associated with MV derivation based on the regression model.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology-Coded representation of immersive media-Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

Merge Mode

To increase the coding efficiency of motion vector (MV) coding in HEVC, HEVC has the Skip, and Merge mode. Skip and Merge modes obtain the motion information from spatially neighbouring blocks (spatial candidates) or a temporal co-located block (temporal candidate). When a PU is Skip or Merge mode, no motion information is coded. Instead, only the index of the selected candidate is coded. For Skip mode, the residual signal is forced to be zero and not coded. In HEVC, if a particular block is encoded as Skip or Merge, a candidate index is signalled to indicate which candidate among the candidate set is used for merging. Each merged PU reuses the motion information including the MV, prediction direction, and reference picture index of the selected candidate.

For Merge mode in HM-4.0 test model for HEVC, up to four spatial MV candidates (i.e., $A_0$, $A_1$, $B_0$ and $B_1$), and one temporal MV candidate (i.e., $T_{BR}$, or $T_{CTR}$ if $T_{BR}$ not available) are checked for a current CU 210 as shown in FIG. 2.

Note that if any of the four spatial MV candidates is not available, the position $B_2$ is then used to derive the MV candidate as a replacement. After the derivation process of the four spatial MV candidates and one temporal MV candidate, removing redundancy (pruning) is applied to remove any redundant MV candidates. If after removing redundancy (pruning), the number of available MV candidates is smaller than five, three types of additional candidates are derived and added to the candidate set (i.e., candidate list). The encoder selects one final candidate within the candidate set for Skip or Merge modes based on the rate-distortion optimization (RDO) decision, and transmits the index to the decoder.

While the regression based motion vector field (RMVF) technique has shown to improve coding efficiency, the computational complexity related to the RMVF technique is very high. Therefore, the present invention discloses various methods and apparatus to reduce the computational complexity related to the RMVF technique.

BRIEF SUMMARY OF THE INVENTION

A method and apparatus for video coding using the regression based motion vector field (RMVF) technique are disclosed. According to the method, pixel data associated with a current block at an encoder side or coded data associated with the current block to be decoded at a decoder side are received. One or more CPMVs (Control-Point Motion Vectors), affine parameter sets or regression models for the current block are derived based on a non-adjacent affine-coded block. At least one of said one or more CPMVs, at least part of the affine parameter sets or at least part of the regression models is blended with neighbouring MVs (Motion Vectors) of subblocks within a neighbouring region associated with said at least one of said one or more CPMVs, said at least part of the affine parameter sets or said at least part of the regression models to generate at least one blended MV (Motion vector). A CPMV set comprising said at least one blended MV is inserted into a merge candidate list. The current block is encoded or decoded using information comprising the merge candidate list.

In one embodiment, said one or more CPMVs correspond to a bottom-left CPMV (Control-Point Motion Vector), a top-left CPMV and a top-right CPMV. Furthermore, a bottom-left blended MV is generated for the CPMV, a top-left blended MV is generated for the top-left CPMV, and a top-right blended MV is generated for the top-right CPMV.

In one embodiment, said at least one blended MV is generated using a weighted sum of said at least one of said one or more CPMVs and the neighbouring MVs. In one embodiment, weights for the weighted sum is dependent on block distance, block size or both. In another embodiment, weights for the weighted sum are pre-defined.

According to another method, a subset of subblocks of a non-adjacent affine-coded block is determined, wherein the subset of subblocks is less than a total number of subblocks in the non-adjacent affine-coded block. A set of CPMVs (Control-Point Motion Vectors) or SBMVs (Subblock Motion Vectors) associated with the subset of subblocks for the current block are derived based on the subset of subblocks of the non-adjacent affine-coded block. One or more derived MVs (Motion Vectors) are derived for the current block based on a regression process with input MVs including the set of CPMVs or SBMVs associated with the subset of subblocks of the non-adjacent affine-coded block. Said one or more derived MVs are inserted into a merge candidate list. The current block is encoded or decoded using information comprising the merge candidate list.

In one embodiment, the set of CPMVs or SBMVs correspond to a bottom-left SBMV (Subblock Motion Vector), a top-left SBMV and a top-right SBMV. In one embodiment, one derived MV for the current block is determined based on the bottom-left SBMV, the top-left SBMV and the top-right SBMV.

In one embodiment, the input MVs further comprise SBMVs of neighbouring subblocks of the current block. A first derived MV for the current block is determined based on the set of CPMVs or SBMVs associated with the subset of subblocks of the non-adjacent affine-coded block; a second derived MV for the current block is determined based on the SBMVs of neighbouring subblocks of the current block; and a final derived MV is generated by blending the first derived MV and the second derived MV. In one embodiment, the final derived MV corresponds to a weighted sum of the first derived MV and the second derived MV, and the first derived MV has a higher weighting than the second derived MV.

BRIEF DESCRIPTION OF THE DRAWINGS

FIG. 2 illustrates an example of merge mode candidate derivation from spatial and temporal neighbouring blocks.

FIG. 3A illustrates an example of the affine motion field of a block described by motion information of two control point (4-parameter).

FIG. 3B illustrates an example of the affine motion field of a block described by motion information of three control point motion vectors (6-parameter).

FIG. 6A illustrates an example of derivation of CPMVs of the current CU based on RVMF, where a motion vector at the center of the current block is derived using subblock motion vector field of a non-adjacent CU according to a regression model.

FIG. 6B illustrates an example according to an embodiment of the present invention, where only three subblock MVs (SBMVs) in a non-adjacent CU are used to derive the motion vector for the current CU.

FIG. 7 illustrates an example according to an embodiment of the present invention, where the CPMVs of the non-adjacent CU and spatial neighbouring SBMVs are used for regression model derivation.

DETAILED DESCRIPTION OF THE INVENTION

Figure 1A:
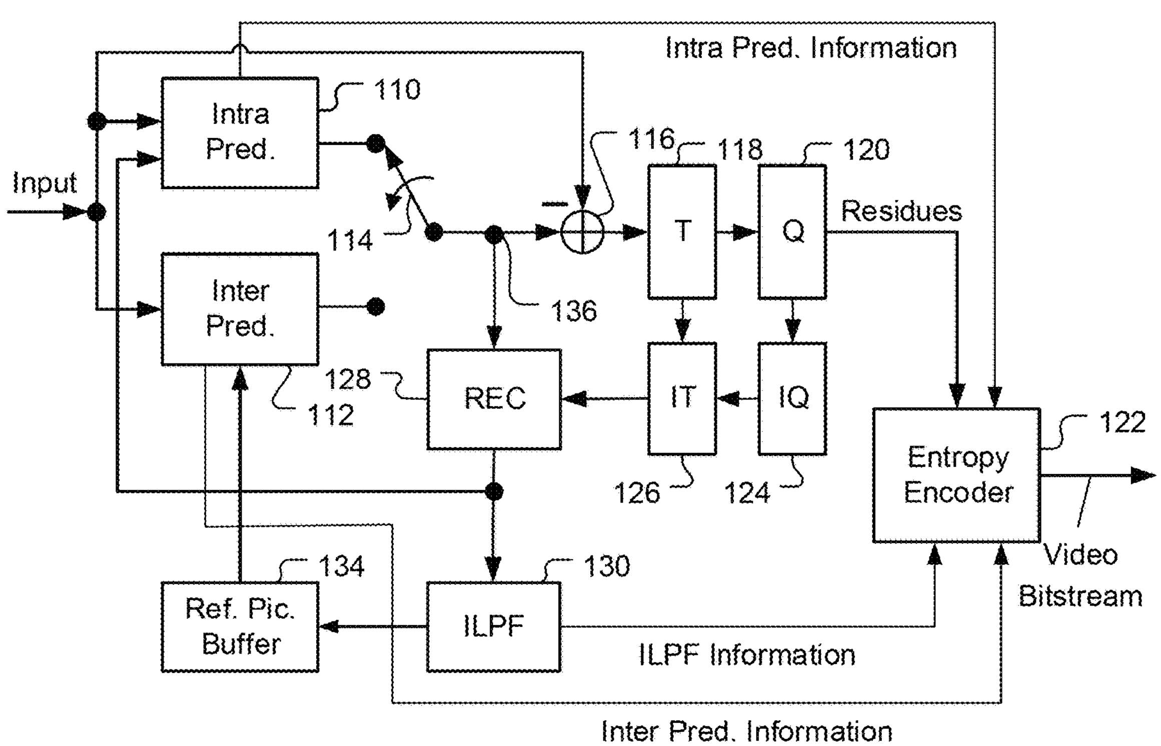
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Affine Motion Compensated Prediction

In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. As shown FIGS. 3A-B, the affine motion field of the block 310 is described by motion information of two control point (4-parameter) in FIG. 3A or three control point motion vectors (6-parameter) in FIG. 3B.

For 4-parameter affine motion model, motion vector at sample location (x, y) in a block is derived as:

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases} \quad (1)$$

For 6-parameter affine motion model, motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad (2)$$

where $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

Figure 4:
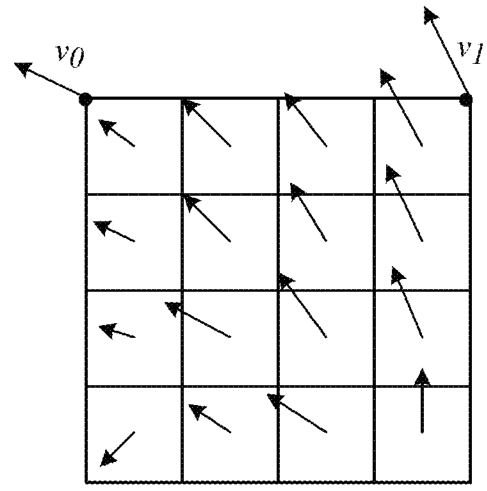
FIG. 4 illustrates an example of block based affine transform prediction, where the motion vector of each 4×4 luma subblock is derived from the control-point MVs.

In order to simplify the motion compensation prediction, block based affine transform prediction is applied. To derive motion vector of each 4×4 luma subblock, the motion vector of the centre sample of each subblock, as shown in FIG. 4, is calculated according to above equations, and rounded to 1/16 fraction accuracy. Then, the motion compensation interpolation filters are applied to generate the prediction of each subblock with the derived motion vector. The subblock size of chroma-components is also set to be 4×4. The MV of a 4×4 chroma subblock is calculated as the average of the MVs of the top-left and bottom-right luma subblocks in the collocated 8×8 luma region.

As is for translational-motion inter prediction, there are also two affine motion inter prediction modes: affine merge mode and affine AMVP mode.

Affine Merge Prediction

AF_MERGE mode can be applied for CUs with both width and height larger than or equal to 8. In this mode, the CPMVs (Control Point MVs) of the current CU is generated based on the motion information of the spatial neighbouring CUs. There can be up to five CPMVP (CPMV Prediction) candidates and an index is signalled to indicate the one to be used for the current CU. The following three types of CPVM candidate are used to form the affine merge candidate list:

- Inherited affine merge candidates that are extrapolated from the CPMVs of the neighbour CUs
- Constructed affine merge candidates CPMVPs that are derived using the translational MVs of the neighbour CUs
- Zero MVs The Affine merge mode is signalled using a CU-level flag as one kind of sub-block merge mode, with another sub-block merge mode indicating the SBTMvp mode.

Regression Based Motion Vector Field (RMVF)

Figure 5:
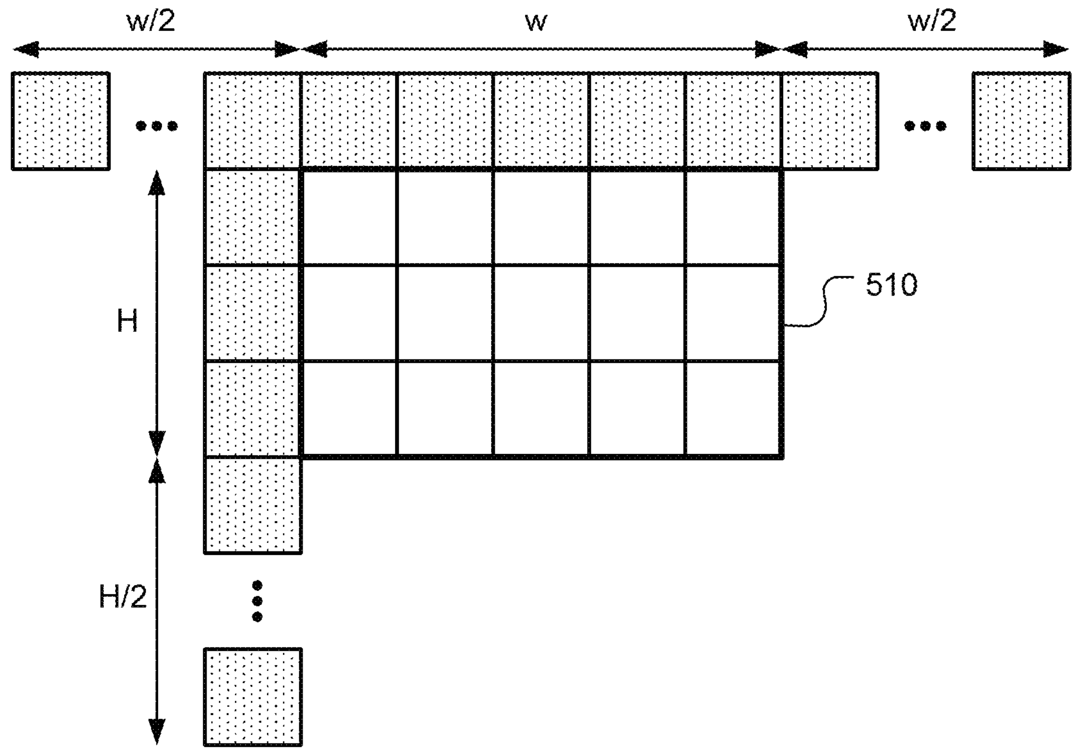
FIG. 5 illustrates an example of the spatially neighbouring subblocks of the current CU used for RMVF (Regression-based Motion Vector Field) motion parameter derivation.

Motion behaviour may vary inside a block. Particularly, for larger CUs, it is not efficient to represent the motion behaviour with only one motion vector. A RMVF method models such motion behaviour based on the motion vectors of the spatially neighbouring subblocks. The spatially neighbouring subblocks of the current CU used for RMVF motion parameter derivation are shown in FIG. 5. The motion vectors and center positions from the neighbouring subblocks of the current CU are used as the input to the linear regression process to derive a set of linear model parameters, i.e., $\{a_{xx}, a_{xy}, a_{yx}, a_{yy}, b_x, b_y\}$ by minimizing mean square error. In FIG. 5, the current CU 510 is shown as a thick-lined rectangle and the current CU is divided into subblocks shown as small empty square. The spatially neighbouring subblocks of the current CU are shown as dot-filled squares.

A motion vector $(MV_{X\_subPU}, MV_{Y\_subPU})$ for a subblock in current CU with the center location at $(X_{subPU}, Y_{subPU})$ is then calculated as:

$$\begin{bmatrix} MV_{X\_subPU} \\ MV_{Y\_subPU} \end{bmatrix} = \begin{bmatrix} a_{xx} & a_{xy} \\ a_{yx} & a_{yy} \end{bmatrix} \begin{bmatrix} X_{subPU} \\ Y_{subPU} \end{bmatrix} + \begin{bmatrix} b_x \\ b_y \end{bmatrix}$$

Finally, the motion field of the current CU is refined by the derived regression model.

Using SBMV for Candidate Derivation for Non-Adjacent CU

The concept of using MV of non-adjacent CU for translational merge MV candidate and AMVP MV candidate derivation can be applied to affine mode as well. The CPMV of non-adjacent affine coded CU can be used to derive the CPMV of the current block for the merge MV candidate and AMVP MV candidate. The following equations can be used to derive the CPMV of the current block:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (3)$$

Or $$\begin{cases} v_x = \frac{(v_{1x} - v_{0x})}{w}x + \frac{(v_{2y} - v_{0y})}{h}y + v_{0x} \\ v_y = \frac{(v_{1y} - v_{0y})}{w}x + \frac{(v_{2x} - v_{0x})}{h}y + v_{0y} \end{cases} \quad (4)$$

In the above equations, (x, y) represents a particular point in the current block, which can be the location of the control point of the current block. $(v_{0x}, v_{0y})$ is the control point motion vector $V_0$ on the top-left corner of the reference block, $(v_{1x}, v_{1y})$ is the control point motion vector $V_1$ on the above-right (or top-right) corner of the reference block and $(v_{2x}, v_{2y})$ is the control point motion vector $V_2$ on the bottom-left corner of the reference block. (w, h) is the width and height of the reference block.

However, the stored CPMV of the non-adjacent CU requires a lot of memory space which is not friendly for hardware based implementation. Therefore, it is proposed to use the subblock MVs (SBMVs, the M×N subblock MV where the M and N are positive integers, such as 4) of the non-adjacent CU to derive the CPMV of the current block instead of using the CPMV of the non-adjacent CU. Furthermore, for CPMV derivation of the current CU using SBMV of a non-adjacent CU, two or more SBMVs of four corner subblocks of the non-adjacent CU or two or more SBMVs inside the non-adjacent CU are used to derive the CPMV of the current block. When using the SBMV of corner subblocks of the reference block for derivation, the w and h can be still equal to the width and height of the reference block, or equal to (width−M) and (height−N), or equal to (width>>1) and (>>1) of the reference block.

In one embodiment, for affine CPMV derivation, the candidate from the neighbouring adjacent CU can use CPMV, and the candidate from the non-adjacent CU uses SBMV for derivation. In another embodiment, for affine CPMV derivation, the candidate from the neighbouring adjacent CU or within a derived or pre-defined region can use CPMV for derivation; otherwise, the candidate from the non-adjacent CU and outside of the region uses SBMV for derivation. The region can be the current CTU, or current CTU and left CTU, or a P×Q area (P and Q are positive integers), or multiple of VPDU (Virtual Processing Data Unit). In one example, for the neighbouring CU in the above CTU row, the left CTU column, or a CTU in a different slice/tile, only selected SBMVs (e.g., corner SBMVs) are used.

FIG. 6A illustrates an example of derivation of CPMVs of the current CU based on RVMF, where a motion vector at the center of the current block 610 is derived using subblock motion vector field of a non-adjacent CU 620 according to a regression model. FIG. 6B illustrates an example according to an embodiment of the present invention, where only three subblock MVs (SBMVs) in a non-adjacent CU 620, instead of all subblock MVs, are used to derive the motion vector for the current CU 610. Since the subblock MVs are already stored in the coding system, the use of subblock MVs does not require any extra storage. The use of three SBMVs of a non-adjacent CU to derive the MV for the current block can greatly reduce the regression model based derivation.

Regression-Based Affine Candidate Derivation

As described earlier, the RMVF method takes motion vectors of spatially neighbouring subblocks as input to derive regression model for the current CU motion field refinement. The non-adjacent affine candidate derivation concept can be combined with the RMVF method.

In one embodiment, the motion vectors of reconstructed spatial neighbouring subblocks and either the motion information (e.g., subblock motion vectors or CPMVs) of non-adjacent affine CUs or the motion information of the current CU derived from the affine parameters of non-adjacent affine CUs are used as input to derive a regression model. By using the regression model, the CPMV of the current block can be derived. For N non-adjacent affine CUs, we can derive N CPMV candidates for the current block. When using the CPMVs of non-adjacent affine CUs or the CPMVs of the current block derived from non-adjacent affine CU for regression, the weighting of CPMV should be increased because the CPMV can represent all the subblocks of the non-adjacent CU or all the subblocks of the current block. However, in this method, for N non-adjacent affine CUs, N regression processes need to be performed.

For using spatial neighbouring SBMVs and motion information of non-adjacent CU for regression, the SBMVs of non-adjacent CU are used in one example. The CPMVs of the non-adjacent CU and spatial neighbouring SBMVs are used in another example as shown in FIG. 7. For using the CPMVs of non-adjacent CU, the CPMVs of non-adjacent CU are used to derive the SBMVs of the current block in one embodiment. The derived SBMVs of the current block based on CPMVs 725 of the non-adjacent CU, and the spatial neighbouring SBMVs 735 are used for regression as shown in FIG. 7, where the spatial neighbouring subblocks 730 of the current block 710 are shown as dot-filled squares and block 720 corresponds to the non-adjacent CU coded in an affine mode. In another embodiment, the CPMVs of non-adjacent CU are used to derive the CPMV of the current block. The derived CPMVs of the current block are weighted with higher weights and combined with the spatial neighbouring SBMVs for regression. In another embodiment, the CPMVs of non-adjacent CU are weighted with higher weights and combined with the spatial neighbouring SBMV for regression. While FIG. 7 illustrates all the spatial neighbouring SBMVs are used for regression, the present invention may also use partial spatial neighbouring SBMVs for regression.

Figure 8:
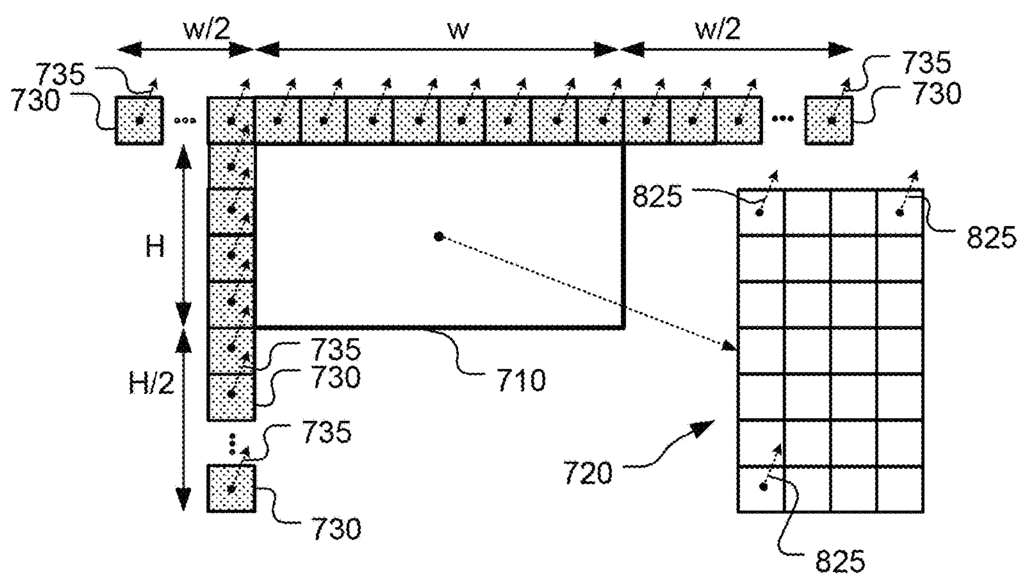
FIG. 8 illustrates an example similar to that in FIG. 7, where the SBMVs of the non-adjacent CU and spatial neighbouring SBMVs are used for regression model derivation.

For using the SBMVs of non-adjacent CU, the SBMVs of non-adjacent CU and the spatial neighbouring SBMVs are used for regression according to another embodiment as shown in FIG. 8. The method shown in FIG. 8 is similar to that in FIG. 7. However, instead of CPMVs 725 of the non-adjacent CU 720 in FIG. 7, the SBMVs 825 of the top-left, top-right and bottom-left subblocks are used for regression in FIG. 8. In another embodiment, the corner SBMVs of non-adjacent CU are used as the CPMVs of the non-adjacent CU to derive the SBMVs of the current block. The derived SBMVs of the current block and the spatial neighbouring SBMVs are used for regression. In another embodiment, the corner SBMVs of non-adjacent CU are used as the CPMVs of the non-adjacent CU to derive the CPMVs of the current block. The derived CPMVs of the current block are weighted with higher weights and combined with the spatial neighbouring SBMV for regression. In another embodiment, two or more SBMVs of non-adjacent CU are used to derive the CPMVs of the non-adjacent CU, to derive the CPMVs of the current block, or to derive the CPMVs of the non-adjacent CU. The derived CPMV are weighted with higher weights and combined with the spatial neighbouring SBMV for regression.

Figure 9:
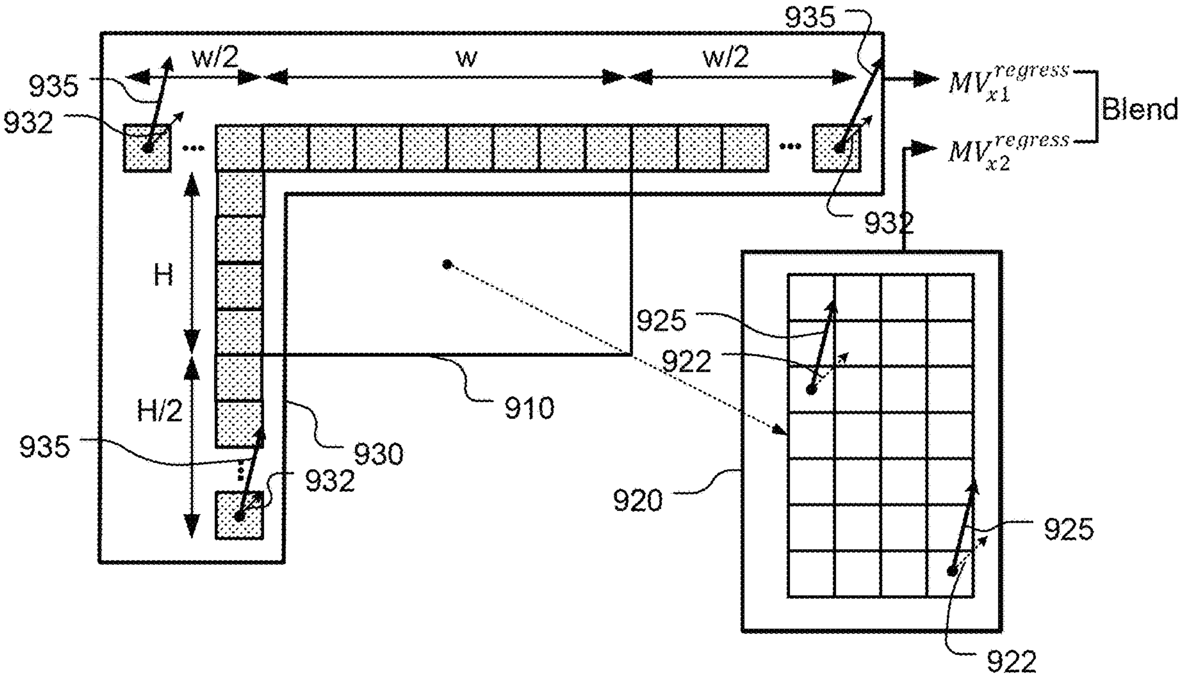
FIG. 9 illustrates an example of regression MV derivation according to an embodiment of the present invention, where one regression-based MV is derived from neighbouring subblocks and another regression-based MV is derived from a non-adjacent CU, and the two derived MVs are blended.

In another invention, we propose to take the motion vectors of spatially neighbouring subblocks as input to derive a regression model (indicated as Mn). Also, the motion information (e.g., subblock motion vectors or CPMVs) of non-adjacent affine CUs or the motion information of the current CU derived from the affine parameters of non-adjacent affine CUs are used to derive a set of regression models (indicated as {Ma1, Ma2, . . . , MaN}, where N=the number of non-adjacent affine CUs). By blending Mn with {Ma1, Ma2, . . . , MaN} in a certain derivation method, a final set of regression models can be obtained (indicated as {Mf1, Mf2, . . . , MfN}) and used to refine the motion field in a CU. The final set of regression models, {Mf1, Mf2, . . . , MfN} can be used to derive N CPMV candidates for the current block as shown in FIG. 9. In this method, the regression only needs to be performed once. The affine parameter blending can use the information related to the number of spatially reconstructed neighbouring subblocks, the number of subblocks of the non-adjacent CU, the number of subblocks of the current block, the distance of the non-adjacent CU and the current block, and any combination of thereof.

As shown in FIG. 9, one MV (denoted as $$M_{x1}^{regress}$$

) is derived using regression based on SBMVs of the neighbouring subblocks 930. Another MV (denoted as $$M_{x2}^{regress}$$

) corresponds to the regression model derived from subblock MVs of non-adjacent CU 920. In FIG. 9, only one non-adjacent affine-coded CU and only one derived MV $$M_{x2}^{regress}$$

are illustrated for simplicity. However, there may be N non-adjacent affine-coded CUs and N derived MV $$M_{x2}^{regress}.$$

Furthermore, the SBMVs 932 from partial neighbouring subblocks can be used (only 3 SBMVs used in the example of FIG. 9) to derive the regression based MV 935 for the neighbouring region 930 instead of all neighbouring subblocks. Similarly, the inherited MVs 925 for partial subblocks of the non-adjacent CU (only two subblocks shown in FIG. 9) can be used to derive the regression based MV 925 for the non-adjacent CU.

In one embodiment, a regression model (indicated as Mn) is derived from the motion vectors of spatially neighbouring subblocks and a CPMV set (denoted as Cn) of the current CU can be derived from Mn. On the other hand, several CPMV sets (indicated as {Ca1, Ca2, . . . , CaN}, where N=the number of non-adjacent affine CUs) can be obtained or derived from non-adjacent affine CUs. By blending Cn and {Ca1, Ca2, . . . , CaN} with weights according to the block distance and/or block size or the pre-defined weights for Cn and {Ca1, Ca2, . . . , CaN}, multiple final CPMV sets can be obtained (e.g. {Cf1, Cf2, . . . , CfN}, where N=the number of non-adjacent affine CUs) and used to refine the motion field in a CU.

In another embodiment, one CPMV set, one affine parameter set or one regression model is derived from the motion vectors of spatially neighbouring subblocks. One or more CPMV sets, affine parameter sets or regression models are obtained or derived from non-adjacent affine CUs. With the CPMV/affine parameter/regression model, the MV field for the current block derived from spatially neighbouring subblocks and the MV field of the current block derived from the non-adjacent CU can be derived. These two motion fields can be blending in subblock MV level according to the position inside the CU as sown in FIG. 9. For example, the subblock near to the CU boundary can have higher weight for the MV field derived from spatially neighbouring subblocks and the SB far from the CU boundary can have higher weights for the MV field derived from the non-adjacent CU. Also the other way around can also be applied (e.g. the subblock near the CU boundary can have a lower weight for the MV field derived from spatially neighbouring subblocks and the subblock far from the CU boundary can have a lower weight for the MV field derived from the non-adjacent CU).

In one invention, one or more CPMV sets, affine parameter sets or regression models are obtained or derived from non-adjacent affine CUs by SBMVs, CPMVs or regression. By blending the CPMV sets, affine parameter sets or regression models with top-left, top-right and bottom-left neighbouring MVs, one or more novel affine candidates are derived. For example, the top-left CPMV derived from non-adjacent affine CUs can be blended with one or more top-left neighbouring MVs. The top-right CPMV derived from non-adjacent affine CUs can be blended with one or more top-right neighbouring MVs. Also, the bottom-left CPMV derived from non-adjacent affine CUs can be blended with one or more bottom-left neighbouring MVs. Each CPMV can be blended with neighbouring MVs respectively.

Figure 10:
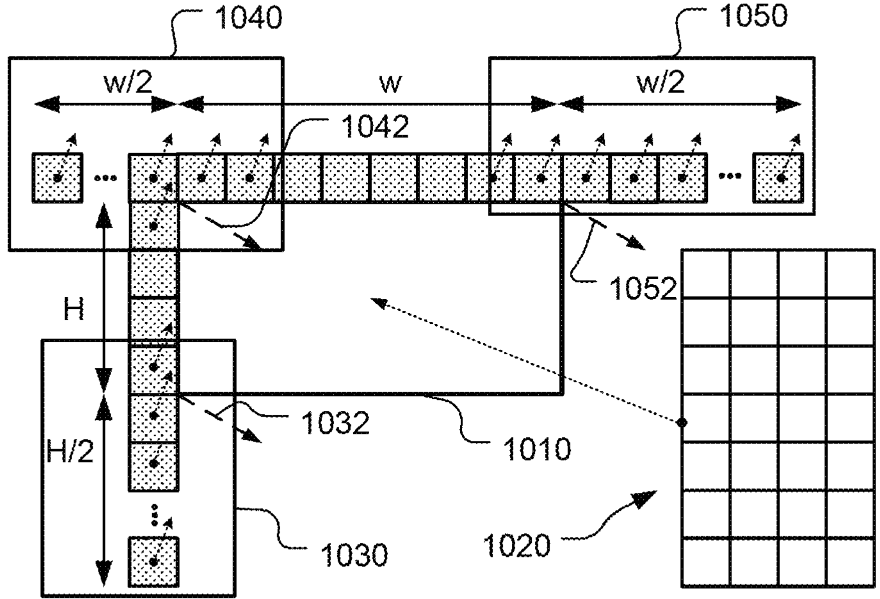
FIG. 10 illustrates an example of regression MV derivation according to an embodiment of the present invention, where CPMVs are derived from a non-adjacent CU and the CPMVs are blended with neighbouring SBMVs respectively.

In one invention, one or more CPMV sets, affine parameter sets or regression models are obtained or derived from non-adjacent affine CUs by SBMVs, CPMVs or regression. By blending the CPMV sets, affine parameter sets or regression models with the affine model derived from top-left, top-right and bottom-left neighbouring MVs, one or more novel affine candidates are derived. For example, the top-left CPMV derived from non-adjacent affine CUs can be blended with affine model derived from top-left neighbouring MVs. The top-right CPMV derived from non-adjacent affine CUs can be blended with the affine model derived from top-right neighbouring MVs. Furthermore, the bottom-left CPMV derived from non-adjacent affine CUs can be blended with the affine model derived from bottom-left neighbouring MVs. Each CPMV can be blended with the affine model derived from neighbouring MVs respectively. An example of this embodiment is shown in FIG. 10, where CPMVs 1032, 1042 and 1052 for the current CU 1010 are derived based on a non-adjacent CU 1020. The derived CPMVs 1032, 1042 and 1052 are blended with bottom-left, top-left and top-right and neighbouring MVs in neighbouring regions 1030, 1040 and 1050 respectively. For example, CPMV 1042 is blended with SBMVs in the top-left region 1040.

Any of the proposed methods or processes herein be combined. Also, for the SBMV of the non-adjacent CU, it can be subsampled. For example, the SBMV can be subsampled by 2/4/8/16/32/64/N in the x and y direction respectively, wherein N is a positive integer. In another example, the SBMV can be subsampled by 2×2/4×4/8×8/16×16/32×32/64×64/N×N in the x and y direction respectively, wherein N is a positive integer. In one embodiment, for the non-adjacent CU outside the current CTU/CTU row, or current CTU and left CTU, or a derived/predefined region, or any combination of above, the subsampled SBMV is used. Otherwise, the non-subsampled SBMV can be used.

Figure 1B:
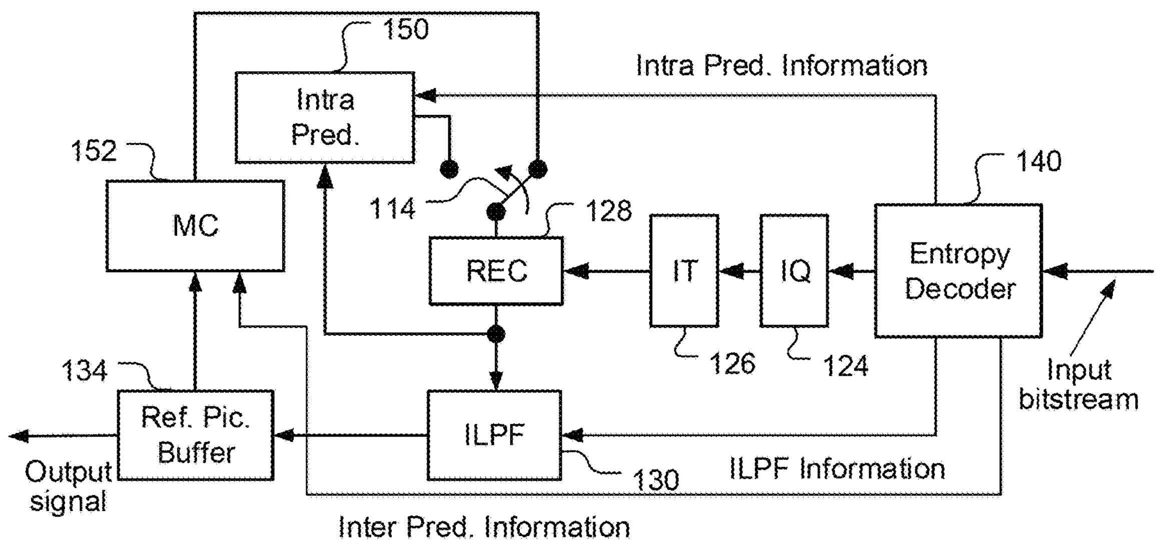
FIG. 1B illustrates a corresponding decoder for the encoder in FIG. 1A.

Any of the motion vector derivation methods for the affine merge mode described above can be implemented in encoders and/or decoders. For example, any of the proposed methods can be implemented in an inter coding module of an encoder (e.g. Inter Pred. 112 in FIG. 1A), a motion compensation module (e.g., MC 152 in FIG. 1B) of a decoder, or a merge candidate derivation module in the encoder or the decoder, where the CPMVs, affine parameter sets or regression models can be derived and used to generate a blended MV for inserting into a merge candidate list. Alternatively, any of the proposed methods can be implemented as a circuit coupled to the inter coding module of an encoder and/or motion compensation module, a merge candidate derivation module of the decoder. While the Inter-Pred. 112 and MC 152 are shown as individual processing units to support the motion vector derivation methods for the affine merge mode, they may correspond to executable software or firmware codes stored on a media, such as hard disk or flash memory, for a CPU (Central Processing Unit) or programmable devices (e.g. DSP (Digital Signal Processor) or FPGA (Field Programmable Gate Array)).

Figure 11:
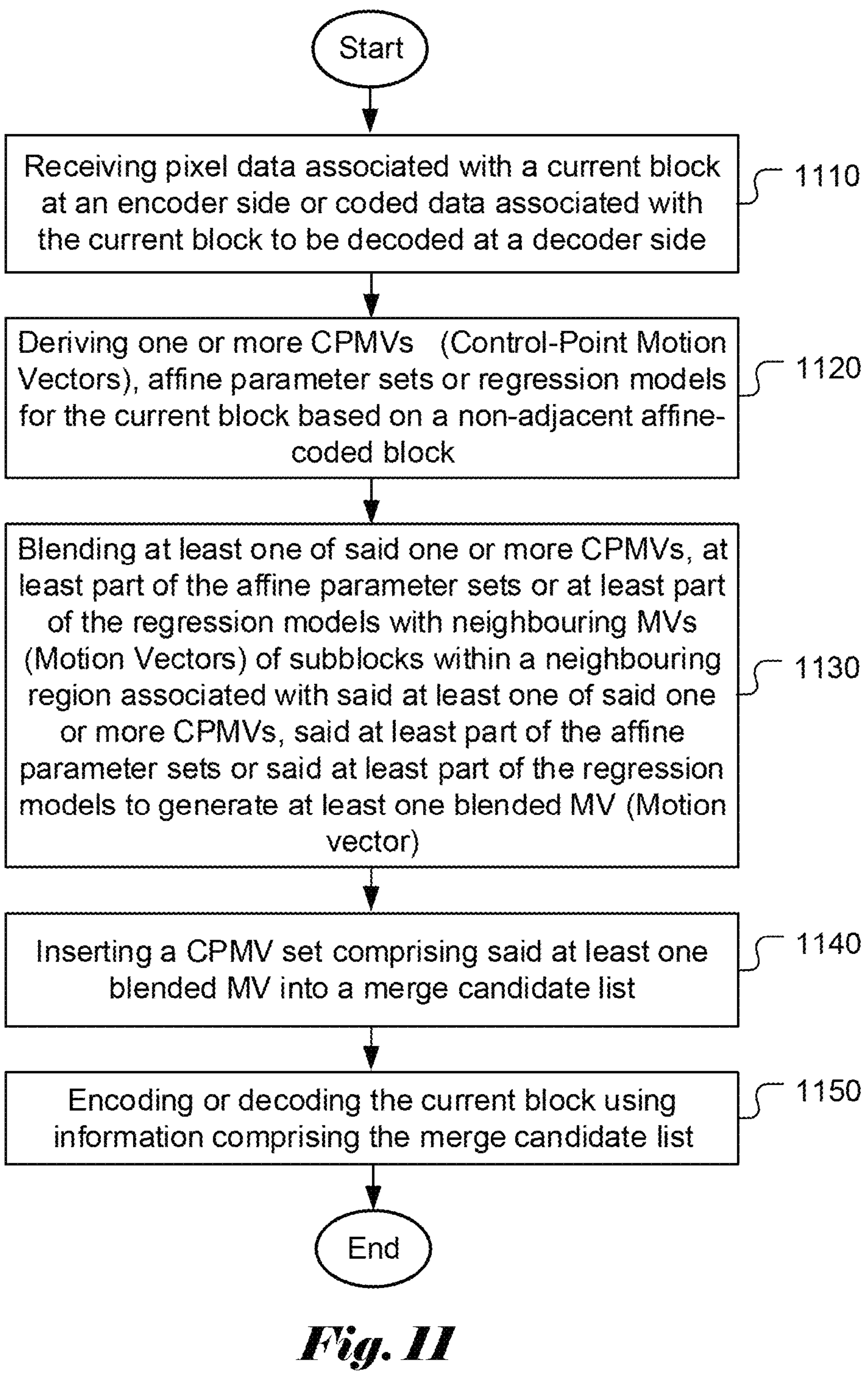
FIG. 11 illustrates a flowchart of one exemplary video coding system that utilizes simplified regression model derivation according to an embodiment of the present invention.

FIG. 11 illustrates a flowchart of one exemplary video coding system that utilizes simplified regression model derivation according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, pixel data associated with a current block at an encoder side or coded data associated with the current block to be decoded at a decoder side are received in step 1110. One or more CPMVs (Control-Point Motion Vectors), affine parameter sets or regression models for the current block are derived based on a non-adjacent affine-coded block in step 1120. At least one of said one or more CPMVs, at least part of the affine parameter sets or at least part of the regression models are blended with neighbouring MVs (Motion Vectors) of subblocks within a neighbouring region associated with said at least one of said one or more CPMVs, said at least part of the affine parameter sets or said at least part of the regression models to generate at least one blended MV (Motion Vector) in step 1130. A CPMV set comprising said at least one blended MV is inserted into a merge candidate list in step 1140. The current block is encoded or decoded using information comprising the merge candidate list in step 1150.

Figure 12:
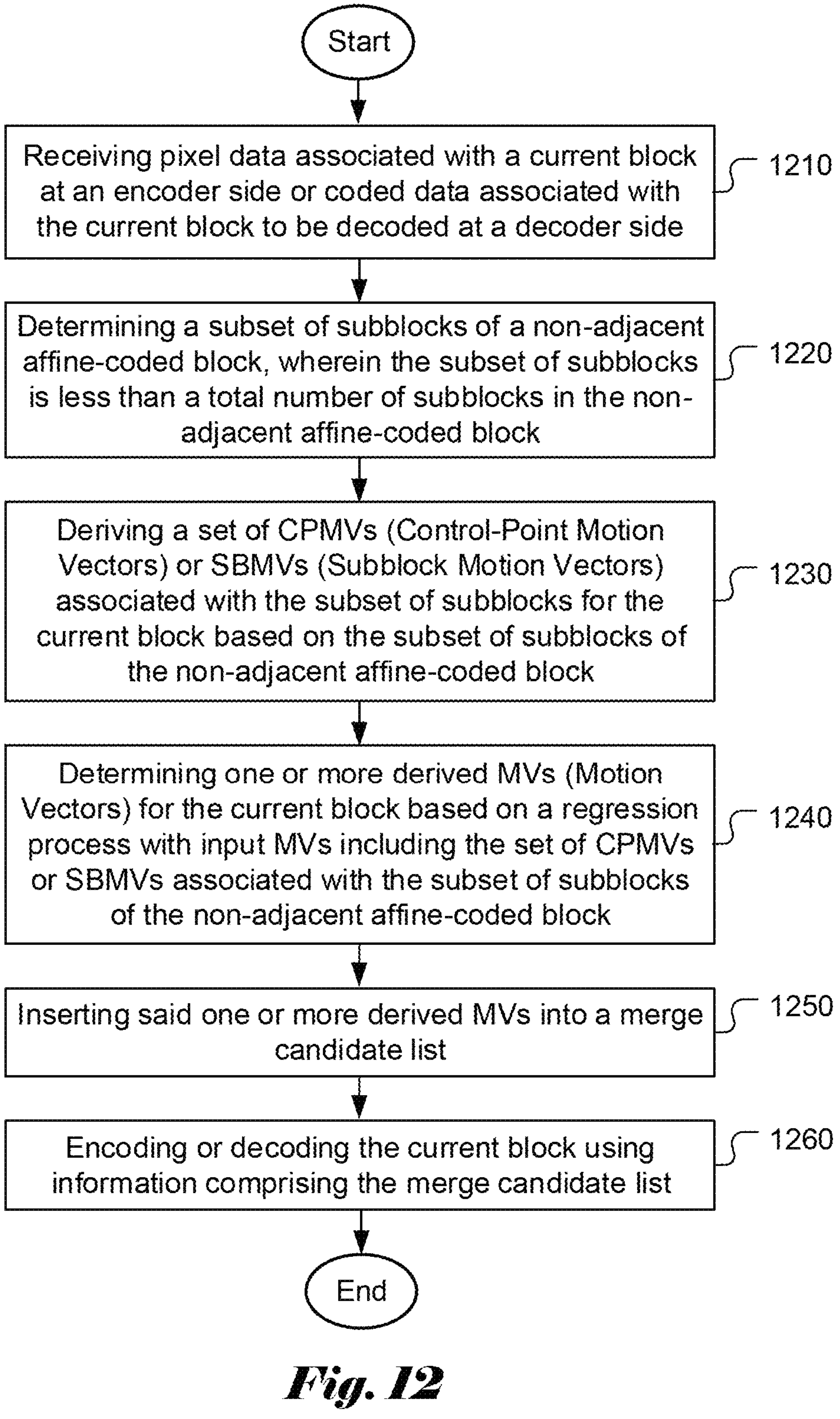
FIG. 12 illustrates a flowchart of another exemplary video coding system that utilizes simplified regression model derivation according to an embodiment of the present invention.

FIG. 12 illustrates a flowchart of another exemplary video coding system that utilizes simplified regression model derivation according to an embodiment of the present invention. According to this method, pixel data associated with a current block at an encoder side or coded data associated with the current block to be decoded at a decoder side are received in step 1210. A subset of subblocks of a non-adjacent affine-coded block is determined in step 1220, wherein the subset of subblocks is less than a total number of subblocks in the non-adjacent affine-coded block. A set of CPMVs (Control-Point Motion Vectors) or SBMVs (Subblock Motion Vectors) associated with the subset of subblocks for the current block are derived based on the subset of subblocks of the non-adjacent affine-coded block in step 1230. One or more derived MVs (Motion Vectors) are derived for the current block based on a regression process with input MVs including the set of CPMVs or SBMVs associated with the subset of subblocks of the non-adjacent affine-coded block in step 1240. Said one or more derived MVs are inserted into a merge candidate list in step 1250. The current block is encoded or decoded using information comprising the merge candidate list in step 1260.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:

receiving pixel data associated with a current block at an encoder side or coded data associated with the current block to be decoded at a decoder side;

deriving one or more CPMVs (Control-Point Motion Vectors), affine parameter sets or regression models for the current block based on a non-adjacent affine-coded block;

blending at least one of said one or more CPMVs, at least part of the affine parameter sets or at least part of the regression models with neighbouring MVs (Motion Vectors) of subblocks within a neighbouring region associated with said at least one of said one or more CPMVs, said at least part of the affine parameter sets or said at least part of the regression models to generate at least one blended MV (Motion Vector);

inserting a CPMV set comprising said at least one blended MV into a merge candidate list; and encoding or decoding the current block using information comprising the merge candidate list.

2. The method of claim 1, wherein said one or more CPMVs correspond to a bottom-left CPMV (Control-Point Motion Vector), a top-left CPMV and a top-right CPMV.

3. The method of claim 2, wherein a bottom-left blended MV is generated for the CPMV, a top-left blended MV is generated for the top-left CPMV, and a top-right blended MV is generated for the top-right CPMV.

4. The method of claim 1, wherein said at least one blended MV is generated using a weighted sum of said at least one of said one or more CPMVs and the neighbouring MVs.

5. The method of claim 4, wherein weights for the weighted sum is dependent on block distance, block size or both.

6. The method of claim 4, wherein weights for the weighted sum are pre-defined.

7. An apparatus for video coding, the apparatus comprising one or more electronics or processors arranged to:

receive pixel data associated with a current block at an encoder side or coded data associated with the current block to be decoded at a decoder side;

derive one or more CPMVs (Control-Point Motion Vectors), affine parameter sets or regression models for the current block based on a non-adjacent affine-coded block;

blend at least one of said one or more CPMVs, at least part of the affine parameter sets or at least part of the regression models with neighbouring MVs (Motion Vectors) of subblocks within a neighbouring region associated with said at least one of said one or more CPMVs, said at least part of the affine parameter sets or said at least part of the regression models to generate at least one blended MV (Motion vector);

insert a CPMV set comprising said at least one blended MV into a merge candidate list; and encode or decode the current block using information comprising the merge candidate list.

8. A method of video coding, the method comprising:

receiving pixel data associated with a current block at an encoder side or coded data associated with the current block to be decoded at a decoder side;

determining a subset of subblocks of a non-adjacent affine-coded block, wherein the subset of subblocks is less than a total number of subblocks in the non-adjacent affine-coded block;

deriving a set of CPMVs (Control-Point Motion Vectors) or SBMVs (Subblock Motion Vectors) associated with the subset of subblocks for the current block based on the subset of subblocks of the non-adjacent affine-coded block;

determining one or more derived MVs (Motion Vectors) for the current block based on a regression process with input MVs including the set of CPMVs or SBMVs associated with the subset of subblocks of the non-adjacent affine-coded block;

inserting said one or more derived MVs into a merge candidate list; and encoding or decoding the current block using information comprising the merge candidate list.

9. The method of claim 8, wherein the set of CPMVs or SBMVs correspond to a bottom-left SBMV (Subblock Motion Vector), a top-left SBMV and a top-right SBMV.

10. The method of claim 9 wherein one derived MV for the current block is determined based on the bottom-left SBMV, the top-left SBMV and the top-right SBMV.

11. The method of claim 8, wherein the input MVs further comprise SBMVs of neighbouring subblocks of the current block.

12. The method of claim 11, wherein a first derived MV for the current block is determined based on the set of CPMVs or SBMVs associated with the subset of subblocks of the non-adjacent affine-coded block, a second derived MV for the current block is determined based on the SBMVs of neighbouring subblocks of the current block, and a final derived MV is generated by blending the first derived MV and the second derived MV.

13. The method of claim 12, wherein the final derived MV corresponds to a weighted sum of the first derived MV and the second derived MV, and the first derived MV has a higher weighting than the second derived MV.

14. An apparatus for video coding, the apparatus comprising one or more electronics or processors arranged to:

receive pixel data associated with a current block at an encoder side or coded data associated with the current block to be decoded at a decoder side;

determine a subset of subblocks of a non-adjacent affine-coded block, wherein the subset of subblocks is less than a total number of subblocks in the non-adjacent affine-coded block;

derive a set of CPMVs (Control-Point Motion Vectors) or SBMVs (Subblock Motion Vectors) associated with the subset of subblocks for the current block based on the subset of subblocks of the non-adjacent affine-coded block;

determine one or more derived MVs (Motion Vectors) for the current block based on a regression process with input MVs including the set of CPMVs or SBMVs associated with the subset of subblocks of the non-adjacent affine-coded block;

insert said one or more derived MVs into a merge candidate list; and encode or decode the current block using information comprising the merge candidate list.

* * * * *